Oct. 11, 1932.  G. HILGER  1,882,596
REFRIGERATING SYSTEM
Filed Jan. 9, 1928   2 Sheets-Sheet 1

Inventor:
George Hilger,
By Chindall Parker Carlson
Attys.

Oct. 11, 1932.   G. HILGER   1,882,596
REFRIGERATING SYSTEM
Filed Jan. 9, 1928    2 Sheets-Sheet 2
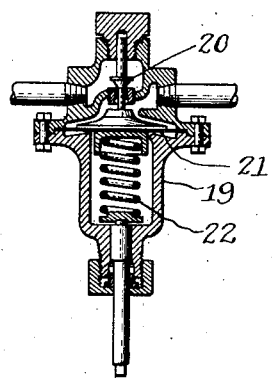
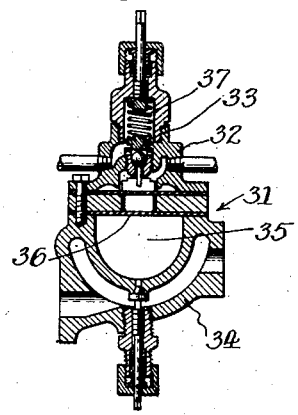
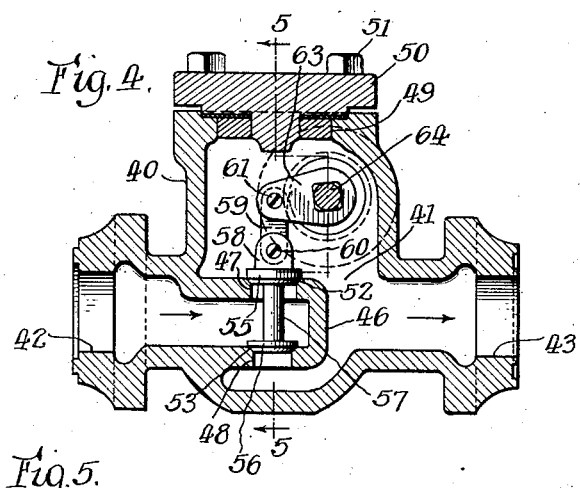
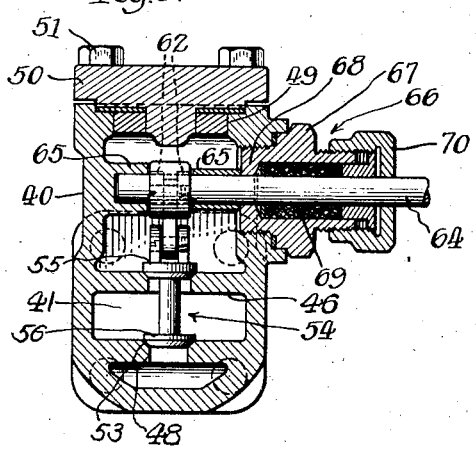

Patented Oct. 11, 1932

1,882,596

UNITED STATES PATENT OFFICE

GEORGE HILGER, OF CHICAGO, ILLINOIS

REFRIGERATING SYSTEM

Application filed January 9, 1928. Serial No. 245,318.

The present invention pertains generally to improvements in refrigerating systems, and more particularly to a refrigerating system in which the flow of refrigerant is automatically controlled by temperature responsive means so as to maintain a predetermined temperature in the system.

The invention has reference to a refrigerating system of the type having one or more refrigerating units, each comprising an expansion element or coil, connected to a charging header receiving refrigerant at a substantially constant pressure from a compressor or other source through a pressure reducing valve, and connected to a suction header discharging to the inlet of the compressor or to said other source. An important object of the present invention resides in the provision in a system of the foregoing type of a novel valve means controlling the flow of refrigerant in accordance with predetermined temperature changes, as for example the rise or fall of the chamber temperature above or below a predetermined point.
Another object is to provide a novel temperature responsive control means which is sensitive, which is quickly responsive and effective to check an undesirable trend in the temperature of the chamber, and which in general provides an improved and close control.

A more specific object of the invention is to provide in a system of the above type a temperature responsive valve means at the suction side of each refrigerating unit which will automatically cut off the passage of refrigerant through the unit when the surrounding temperature falls below a predetermined value. Locating this valve means at the suction side of the unit instead of at the inlet side of the unit has numerous and important advantages. If the valve means were located at the inlet side of the unit, closing of the valve means upon a drop in the controlling temperature below a predetermined point would cut off the supply of refrigerant but would not cut off the exhaust or suction, thereby permitting a further reduction in pressure and hence a further cooling in the unit. Obviously, in numerous instances, as for example where perishable food products, such as eggs, are being cooled, a reduction in temperature below the desired minimum may result in damage to the products. With the valve means at the suction side of the unit, this cannot occur. When the valve means is closed, the flow of refrigerant is immediately cut off. Instead of being further reduced, the pressure in the unit is increased to that of the supply header which is maintained substantially constant by the pressure reducing valve, thereby checking a further substantial drop in the temperature. The liquid in the closed end of the unit being exposed to the surrounding heat and unable to carry the latter away becomes vaporized and thereby backs up the rest of the liquid to the discharge header or at least out of the unit. As a result, the unit is filled with dry gas, and upon reopening the valve means, no slugs of liquid are therefore present to be carried over to the compressor or source with resultant injury to the latter.

A further object resides in the provision of novel control means which when the supply of refrigerant is cut off results in the presence of dry gas and the absence of slugs of liquid in the refrigerating unit.

Still another object resides in the provision of a novel control means of the foregoing character in combination with a valve in the inlet of each unit responsive to the temperature of the refrigerant leaving the unit.

Further objects and advantages will become apparent as the description proceeds. In the accompanying drawings, Figure 1 is a fragmentary perspective view, partially diagrammatic in character, of a refrigerating system embodying the features of my invention.

Fig. 2 is a fragmentary vertical sectional view through a pressure operated expansion valve of preferred construction.

Fig. 3 is a similar view through a temperature control valve employed for each of the refrigerating units.

Fig. 4 is a vertical sectional view through a valve employed in the suction line of each refrigerating unit, and responsive to the outside temperature of each unit.

Fig. 5 is a sectional view taken along line 5—5 of Fig. 4.

Figure 1:
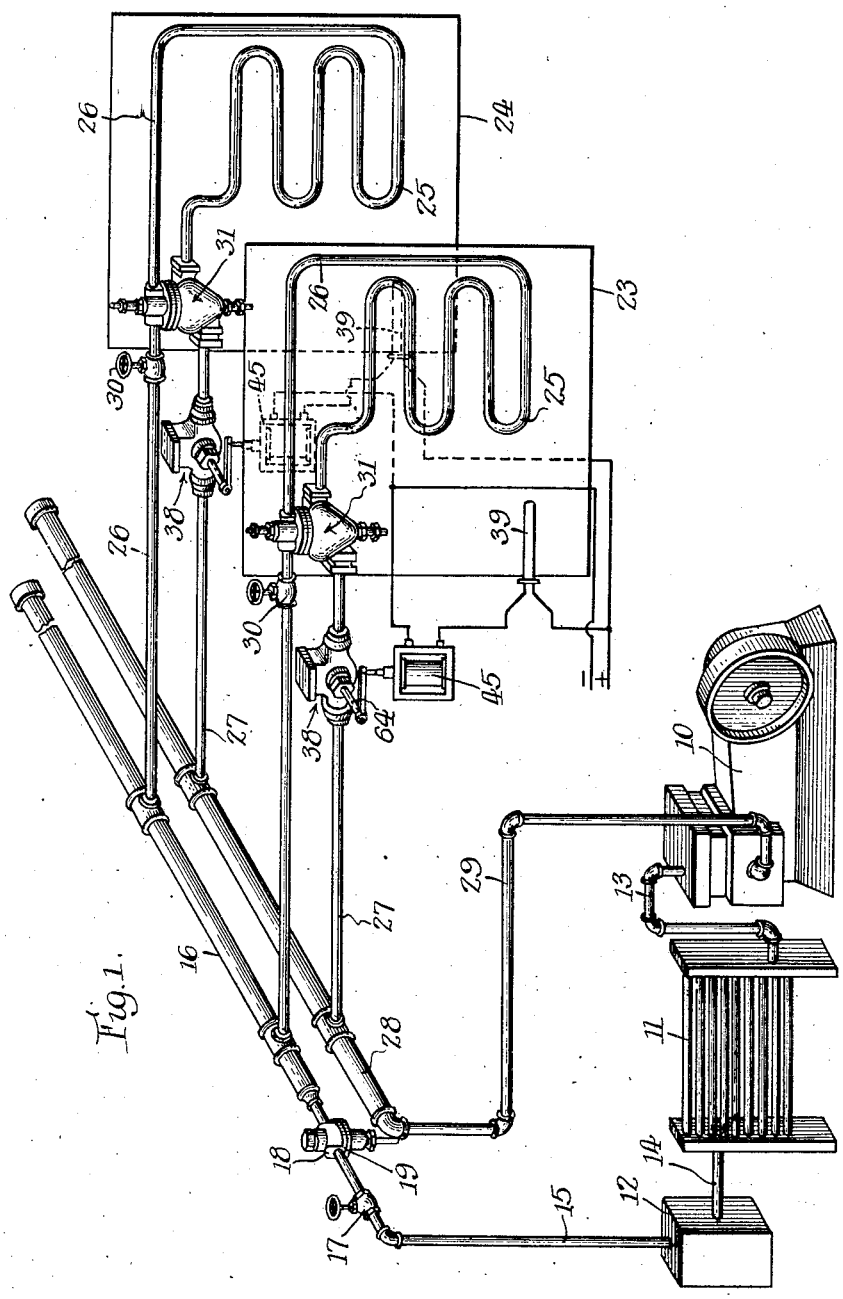

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The system in its preferred form comprises a compressor 10 of suitable character, a condenser 11 and a liquid receiver 12. The compressor has a discharge pipe 13 leading to the condenser. The condenser in turn is connected by a pipe 14 with the liquid receiver 12, and the latter is connected by a pipe 15 with a pipe 16 of relatively large size constituting a charging header. The pipe 15 has a hand operated valve 17 interposed therein, and also an automatic primary expansion valve 18 interposed between the valve 17 and the header 16.

The valve 18 may be of any suitable construction which is under the control of the pressure at the discharge side so as to maintain the latter substantially constant. In the present instance, the valve 18 (see Fig. 2) comprises a casing 19 having at its upper portion a through passageway controlled by a valve member 20. The valve member is connected with a diaphragm 21, and a coiled expansion spring 22 enclosed in the lower portion of the casing maintains a predetermined pressure on the diaphragm which is counter-balanced by the pressure on the discharge side of the valve. By adjusting the spring tension, the pressure on the discharge side of the valve, and in the present instance, in the header 16 may be readily varied.

I have herein shown diagrammatically two rooms or chambers 23 and 24, each containing a refrigerating unit or coil 25. Of the coil 25, the lower or inlet end is connected by a supply pipe 26 with the charging header 16 and the upper or exhaust end is connected by a pipe 27 with a large pipe 28. The latter is connected by a pipe 29 with the suction side of the compressor 10, and constitutes the suction header of the system. The supply pipe 26 for each of the coils 25 is provided with suitable valve means whereby the unit may be cut out of the system at will. Herein, I have shown a simple hand operated valve 30 in each of said pipes for this purpose.

The primary expansion valve 18 serves to maintain in the charging header 16 a supply of refrigerant at a predetermined pressure sufficient to meet the requirements of the several units, this pressure being determined by the lowest temperature which it is desired to maintain in any one of the rooms or chambers. To control the flow of the refrigerant through the several units from the charging header in a manner such as to supply that volume of refrigerant only which the unit is capable of evaporating, I provide an automatic operating valve generally designated by the numeral 31. This valve may be of any suitable form operable to check the flow of refrigerant to the coil when the temperature of the refrigerant at the discharge end of the coil falls below a predetermined point.

In the present instance, the valve 31 (see Fig. 3) comprises a casing 32 having in its upper portion a through passageway controlled by a valve 33, which passageway is connected in the pipe line 26 leading to the coil. The lower portion of the casing is constructed to provide a jacket 34 interposed in the pipe line 27 connected to the return side of the coil. The jacket 34 partially surrounds a chamber 35 in the casing, one wall of said chamber being formed of an insulating diaphragm 36 operatively associated with the valve 33. In the chamber 35 is contained a quantity of ammonia or the like, which being subjected to the temperature of the refrigerant leading from the coil exerts a greater or less pressure on the diaphragm 36 tending to open the valve 33 against the pressure of the refrigerant in the pipe 27 plus the action of the spring tensioning means generally designated 37. By adjusting the spring tension, the pressure of the ammonia in the chamber 35 at which the valve 33 will close its passageway may be readily determined so as to supply to the coil only that volume of refrigerant which it is capable of evaporating. Thus, when the coil is entirely frosted, the temperature of the refrigerant passing through the jacket 34 effects a sufficient reduction of pressure in the chamber 35 to check the flow of refrigerant to the coil preventing a freezing back to the compressor. It will be seen that the gas in the chamber 35 is not influenced by the temperature of the refrigerant in the upper portion of the casing due to the presence of the insulation in the diaphragm 36. This is of importance for the reason that the valve 33 in order to be operative must be set to operate under a fixed temperature difference between the temperature and pressure of the refrigerant passing to the coil and the temperature of the refrigerant returning from the coil. It will be observed that the operation of any of the valves 31 to cut off one or more of the coils 25 reacts upon the pressure in the charging header 16 so as to operate the valve 18 so that the predetermined pressure in the charging header is maintained.

It will thus be obvious that the valve serves to control the flow of refrigerant to the coil in accordance with the temperature of the refrigerant leaving the coil so as to obtain maximum efficiency throughout the length of the coil. Obviously, the valve 31 is not responsive to the room temperature. It will be evident therefore that there may be instances in the normal use of the system in which the temperature of the refrigerant may not be so low as to close the valve 31, but the temperature of the room may be down to the predetermined minimum point. To continue supplying refrigerant to the coil would not only be wasteful but would still further lower the refrigeration, thereby in many instances causing damage where close temperature limits are required. To obviate this difficulty, I have provided a valve designated generally 38 for each coil which is responsive to the temperature of the room, and which automatically controls the passage of refrigerant through the coil in accordance with the room temperature. In this manner a very fine control is obtained. The valve 38 is interposed in the suction line 27 so as to prevent further refrigeration in the coil when closed. If the valve 38 were interposed in the inlet line 26, the coil 25 although cut off from the header 16 upon a drop in temperature below the predetermined point, would still be open to the suction side of the compressor 10 so that the pressure would be further reduced, thereby still further lowering the refrigeration of the chamber. By interposing the valve 38 in the suction line 27, when the valve is closed, the pressure in the coil builds up to the pressure in the header, thereby substantially preventing a further lowering of the temperature, and hence providing a fine and close temperature control regardless of the temperature of the refrigerant. The refrigerant trapped in the coil 25 when the valve 38 is closed, is exposed to the relatively higher temperature of the surrounding chamber, and hence is vaporized into a dry gas which backs up any liquid present into the line 26 and charging header 16. When the valve 38 is opened again, no slugs of liquid will be discharged from the coil 25 to the compressor 10.

Any suitable type of valve 38 may be employed, and the valve may be controlled through the use of any suitable thermostat 39. In the present instance, the valve 38 (see Figs. 4 and 5) comprises a hollow casing 40 having a valve chamber 41, an inlet passage 42 and a discharge passage 43 opening to and from said chamber. Extending from the inlet passage 42 into the chamber 41 is a U-shaped partition wall 46 having axially aligned valve openings 47 and 48 in the side legs. The casing 40 is formed with an opening 49 which is in alignment with the valve openings 47 and 48, and which normally is closed by a cover plate 50 removably secured thereto by screw bolts 51. The end edges of the valve openings 47 and 48, adjacent the opening 49, are beveled to provide valve seats 52 and 53. Slidably mounted in the openings 47 and 48 is a valve member 54 having spaced valves 55 and 56 which are integrally connected by a stem 57, and which are adapted to engage the seats 52 and 53 respectively. By providing opposed valves, a balanced pressure relation is obtained, thereby preventing a fluid pressure differential from influencing the position of the valve member.

Suitable means is provided for adjusting the valve member 54. To this end, the valve stem 57 is formed with two parallel spaced lugs 58 between which one end of a link 59 is pivotally secured by means of a pivot pin 60. The other end of the link 59 is secured by means of a pivot pin 61 between two parallel spaced lugs 62 formed on the end of a crank arm or lever 63. The latter is fixed on a shaft 64 which is journalled in spaced bearings 65 formed in opposite sides of the casing 40, and one end of which projects outwardly through a stuffing box 66 in one side of the casing. In the present instance, the box 66 comprises a suitable nut 67 which is threaded into the casing, and which has a flange 68 at its inner end snugly embracing the shaft 64. A suitable packing 69 is disposed in the nut 67 about the shaft 64, and is adapted to be compressed endwise between the flange 68 and an end cap 70 threaded onto the outer end of the nut 67.

Means is provided for actuating the valve member 54 to close the valve 38 when the temperature in the chamber surrounding the coil falls below a predetermined point. In the present instance, I have shown the shaft 64 operatively connected to the armature of an electromagnet or solenoid 45 so that energization of the electromagnet will result in opening of the valve and deenergization of the electromagnet will result in closing of the valve. To this end, each electromagnet 45 is suitably connected with the thermostat 39 which is exposed to the temperature in the chamber surrounding the coil. Preferably, the electromagnets 45 and the thermostats 39 for the different units are connected in series respectively in parallel circuits controlling the main circuit for the means (not shown) for operating the compressor 10, so that when all of the valves 38 are closed operation of the compressor will automatically stop, and when one or more of the valves 38 are open the compressor will be in operation.

I claim as my invention:

1. A refrigerating system comprising, in combination, a source of refrigerant, a plurality of refrigerating units, each comprising a refrigerating element, connected in parallel to said source, a back pressure reducing valve interposed in the discharge line from said source, said valve being automatically operable to make available a supply of refrigerant at a substantially constant pressure to all of said elements, a plurality of additional valve means one interposed in the inlet of each element and responsive to the temperature of the refrigerant passing therethrough so as to automatically cut off the supply of refrigerant to said element when the temperature thereof falls below a predetermined point, and a plurality of additional valve means one interposed in the outlet of each element and automatically operable to close said outlet when the temperature of the space about said element falls below a predetermined point regardless of the temperature of the refrigerant.

2. A refrigerating system comprising, in combination, a compressor, a charging header connected to the discharge of said compressor, a suction header connected to the suction side of said compressor, a plurality of refrigerating units, each comprising a refrigerating element, connected in parallel across said headers, a reducing valve interposed in the discharge line of said compressor, said valve being automatically operable to make available a supply of refrigerant at a substantially constant pressure in said charging header, a plurality of additional valve means one interposed in the inlet of each element and responsive to the temperature of the refrigerant leaving said element so as to automatically cut off the supply of refrigerant to said element when the temperature falls below a predetermined point, and a plurality of additional valve means one interposed in the outlet of each element and responsive to the temperature of the space about said element so as to automatically close said outlet when the temperature falls below a predetermined point regardless of the temperature of refrigerant.

3. A refrigerating system comprising, in combination, a source of refrigerant, a plurality of refrigerating units, each comprising a refrigerating element connected in parallel to said source, a valve interposed in the discharge line from said source, said valve being automatically operable to make available a supply of refrigerant at a substantially constant pressure to all of said elements, and a plurality of additional valve means one interposed in the outlet of each element and automatically operable to close said outlet when the temperature of the space about said element falls below a predetermined point.

4. A refrigerating system having, in combination, a source of refrigerant, a refrigerating element connected to said source, a back pressure reducing valve in the connection between said source and said element for making available refrigerant at a substantially constant pressure to said element, a valve interposed in the inlet of said element, said valve being responsive to the temperature of the refrigerant to automatically cut off the supply of refrigerant to said element upon a drop in the temperature thereof below a predetermined point, and valve means controlling the outlet of said element and responsive to the temperature about said element so as to cut off the flow of refrigerant through said element when said surrounding temperature falls below a predetermined point regardless of the temperature of the refrigerant.

5. A refrigerating system comprising, in combination, a source of refrigerant, a refrigerating element connected to said source, means automatically operable to render a supply of refrigerant from said source available at a substantially constant pressure to said element, temperature responsive valve means controlling the inlet of said element for automatically governing the flow of refrigerant to said element in accordance with the temperature of the refrigerant, and valve means controlling the outlet of said element for automatically governing the flow of refrigerant through said element in accordance with the temperature of the space adapted to be cooled by said element.

6. A refrigerating system, comprising, in combination, a circulatory system including a compressor, a supply main connected to said compressor and a refrigerating element connected to said main and the suction of said compressor, a first valve means interposed in the system between said compressor and said main for maintaining a lower pressure in said main than in the outlet of said compressor, a second valve means interposed in the system between said main and said refrigerating element for controlling the supply of refrigerant to said element, and temperature responsive means interposed in the suction end of said element for closing said end when the temperature of the space cooled by said element falls below a predetermined point, said second valve means permitting a reverse flow of fluid therethrough upon a reversal in the pressure gradient between said main and said element.

7. The method of operating a refrigerating system of the direct expansion type which consists in maintaining a supply of cooled refrigerant at a substantially constant pressure substantially lower than condenser pressure, discharging the refrigerant from such source of supply into an expansion element such as a coil while regulating the flow of the refrigerant to the coil to the maximum which the coil can evaporate as determined by the temperature of the refrigerant returning from the coil, and preventing the discharge of refrigerant from the coil when the temperature of the space to be cooled falls below a predetermined point while permitting the refrigerant in said coil to return toward the source through the normal inlet.

In testimony whereof, I have hereunto affixed my signature.

GEORGE HILGER.